US00RE48989E

(19) United States
(12) Reissued Patent
Dollahite

(10) Patent Number: US RE48,989 E
(45) Date of Reissued Patent: Mar. 29, 2022

(54) FISHING TACKLE BOX

(71) Applicant: Raleigh Tackle LLC, Tyler, TX (US)

(72) Inventor: David Dollahite, Longview, TX (US)

(73) Assignee: Raleigh Tackle LLC, Tyler, TX (US)

(21) Appl. No.: 16/561,577

(22) Filed: Sep. 5, 2019

Related U.S. Patent Documents

Reissue of:
(64) Patent No.: 10,130,088
Issued: Nov. 20, 2018
Appl. No.: 15/242,836
Filed: Aug. 22, 2016

(51) Int. Cl.
*A01K 97/06* (2006.01)

(52) U.S. Cl.
CPC ..... *A01K 97/06* (2013.01)

(58) Field of Classification Search
CPC ..... A01K 97/06; A01K 97/16; A47F 7/02; A47F 7/021; A47F 7/024; A47F 5/0815; A47F 5/0823; A47F 5/101; A45C 11/16
See application file for complete search history.

(56) References Cited

U.S. PATENT DOCUMENTS 258,393 A * 5/1882 Endicott ..... A01K 97/06 43/57.2
1,482,678 A 2/1924 Figley
1,791,346 A * 2/1931 Burch ..... A01K 97/06 43/57.1
2,102,977 A * 12/1937 Shoemaker ..... A47F 5/0815 248/222.41
2,316,833 A 4/1943 Baron
2,595,463 A * 5/1952 Kamps ..... A01K 97/16 43/57.2
2,616,209 A * 11/1952 Ploen ..... A01K 97/06 43/57.1

(Continued)

FOREIGN PATENT DOCUMENTS

CN 101066048 A 11/2007
CN 201360487 Y 12/2009

(Continued)

OTHER PUBLICATIONS

Chinese Office Action dated Jan. 18, 2021, in connection with corresponding CN Application No. 201680088651.8 (17 pp., including machine-generated English translation).

(Continued)

*Primary Examiner* — Patricia L Engle
(74) *Attorney, Agent, or Firm* — Maier & Maier, PLLC

(57) ABSTRACT

A box for transporting fishing tackle. The tackle box may include a tackle box housing having a rigid outer shell enclosing a first internal cavity and with openings at a front and back end, which may be covered by adjustable closure panels that themselves have receptacles for fishing tackle. The tackle box housing may further include an inside wall, or multiple such walls, having a plurality of lure retaining holes disposed therethrough, each of the lure retaining holes defined by the inside wall having a substantially round wide portion and at least one substantially rectangular narrow portion extending from the wide portion. This wall may be integrated with the tackle box housing or may be provided in a separate insert, and may be formed from a transparent material if desired. Other containers, such as drawers, may also be provided in the tackle box housing or in the insert.

19 Claims, 7 Drawing Sheets

(56) References Cited

U.S. PATENT DOCUMENTS 2,717,470 A * 9/1955 Holdeman ..... A01K 97/06 43/57.1
2,730,833 A * 1/1956 Newell ..... A01K 97/16 43/57.2
2,956,365 A * 10/1960 Smith ..... A01K 97/06 43/57.1
2,987,846 A * 6/1961 Powell ..... A01K 97/06 206/315.11
3,047,349 A * 7/1962 Powell ..... A01K 97/06 312/287
3,310,271 A * 3/1967 King ..... A47F 5/0815 248/220.43
3,481,066 A * 12/1969 Woolworth ..... A01K 97/06 312/200
3,564,755 A * 2/1971 Lindgren, Sr. ..... A01K 97/06 43/57.2
3,813,138 A * 5/1974 Doohan ..... A47B 46/00 312/309
3,850,396 A * 11/1974 Orlandi ..... A47F 5/0815 248/220.42
4,023,304 A * 5/1977 Singer ..... A01K 97/06 312/902
4,176,491 A * 12/1979 Herring ..... A01K 97/06 43/57.1
4,240,222 A * 12/1980 Covington ..... A01K 97/06 206/315.11
4,245,422 A 1/1981 Souza
4,324,446 A * 4/1982 LeSage ..... A45C 11/16 206/566
4,739,886 A * 4/1988 Seaberg ..... A47F 7/02 206/486
4,769,941 A 9/1988 Schmidt
4,811,996 A * 3/1989 Hansson ..... A45C 11/16 206/566
4,958,730 A 9/1990 Bunten
5,054,669 A * 10/1991 Zimbardi et al. ..... A01K 97/06 190/118
5,087,105 A * 2/1992 White ..... A47F 7/02 206/566
5,261,529 A * 11/1993 Holland ..... A47F 7/02 206/486
5,386,662 A 2/1995 Vader et al.
5,526,927 A * 6/1996 McLemore ..... A01K 97/06 206/315.11
5,556,068 A * 9/1996 Gorelik ..... A47F 5/0823 248/214
5,606,820 A * 3/1997 Suddeth ..... A01K 97/06 206/315.11
5,829,185 A 11/1998 Myers
6,202,865 B1 * 3/2001 Kuo ..... A47F 5/0815 211/70.6
6,926,136 B1 * 8/2005 Lynch-Bass ..... A45C 11/16 206/6.1
7,621,074 B2 11/2009 Glidewell et al.
7,937,884 B1 5/2011 Naylor et al.
7,941,965 B2 5/2011 Hoover
10,477,991 B1 * 11/2019 Fragala ..... A47F 7/03
2007/0011939 A1 * 1/2007 Sakai ..... A01K 97/06 43/54.1
2008/0029666 A1 * 2/2008 Hurt ..... A47F 5/0815 248/220.41
2012/0043228 A1 * 2/2012 Ezzo ..... A47F 7/024 206/1.5
2014/0132131 A1 * 5/2014 Thomas ..... E06B 7/34 312/204
2016/0205913 A1 * 7/2016 Aston ..... A01K 97/06

FOREIGN PATENT DOCUMENTS

CN 102972367 A 3/2013
CN 205357836 U 7/2016
EP 0071274 A2 2/1983

OTHER PUBLICATIONS

Chinese Office Action dated Sep. 8, 2021, in connection with corresponding CN Application No. 201680088651.8 (16 pp., including machine-generated English translation).
International Search Report and Written Opinion dated May 19, 2017 of corresponding application No. PCT/US2016/047971; 16 pgs.

* cited by examiner

FISHING TACKLE BOX

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

Fishing tackle, such as fishing hooks, lures, baits, lines, sinkers, or floats, is often stored in a tackle box. Tackle boxes allow these and other items of fishing tackle to be organized so as to be easily retrievable by the fisherman. Tackle boxes also ensure that potentially fragile items are kept spaced apart from one another or are otherwise kept protected from damage, and ensure that certain items of fishing tackle, such as lines or lures, do not become tangled up with one another.

Most conventional tackle box designs are boxes, typically formed from plastic or sheet metal, having several shelves each having a variety of differently-sized compartments, each of which is sized to retain some type of item of fishing tackle. For example, a tackle box might have a shelf with a number of long, thin compartments, each intended to be used to hold a fishing lure laid flat in the compartment. Typically, these shelves are stored such that, when a user opens the top lid of the tackle box, the shelves are splayed outward such that the user can see many of the compartments of each shelf.

However, certain problems with these designs exist. For example, when a fishing lure is put away after use, it will typically be wet; putting these lures away in a box-type container may cause water to pool in the box-type container, causing or accelerating rusting of any of the metal parts of the lure, such as an integrated fishhook. This problem can be particularly acute for users that engage in saltwater fishing; salt residue can cause similar problems even if the lures are allowed to dry before being put away, often necessitating that the lures and even the compartments of the tackle box used to transport the lures be specifically cleaned after use.

Further, despite the fact that many tackle boxes are configured to splay their shelves outward to some degree in order to make their compartments more accessible and more visible, fishing tackle located in a tackle box is often difficult for a user to sort through. For example, a particular compartment may be obscured by a shelf even in an open position, making it difficult for the user to identify the contents of that compartment. In another example, multiple items of fishing tackle may be stacked on top of one another in the same compartment, obscuring from view the items of fishing tackle located lower in the stack.

Also, storing crank-baits, spinner-baits, and other lures inside compartments of a tackle box can result in damage to the paint and finish on the lures. If lures are stored inside compartments of a tackle box, when the tackle box is moved, the lures inside the compartments can shift position inside of the tackle box. If the tackle box is moved sharply, such as if the tackle box is dropped or falls from some height and impacts the ground, the lures can impact the surfaces of the compartments of the tackle box, potentially causing damage to the lures. Further, even routine movement of the tackle box can cause the positions of the lures to constantly shift against the surfaces of the compartments, creating friction between the lures and the surfaces of the compartments, which can damage the paint and finish of the lures.

SUMMARY

An exemplary embodiment of a tackle box may be provided. The tackle box may include a tackle box housing, the tackle box housing having a rigid outer shell enclosing a first internal cavity, and having a front opening at a front end and a back opening at a back end such that each of the front opening and the back opening adjoin the first internal cavity. The tackle box housing may further include an inside wall, or multiple such walls, having a plurality of lure retaining holes disposed therethrough, each of the lure retaining holes defined by the inside wall having a substantially round wide portion and at least one substantially rectangular narrow portion extending from the wide portion; in some embodiments, this wall may be provided on a separate insert. These walls may be, in some embodiments, transparent.

The tackle box may further include at least one adjustable closure panel disposed on each of the front end and the back end of the tackle box housing, the at least one adjustable closure panel of the front end being sized to cover the front opening of the tackle box housing and the at least one adjustable closure panel of the back end being sized to cover the back opening of the tackle box housing, such that each of the adjustable closure panel of the front end and the adjustable closure panel of the back end has at least one receptacle (such as a shelf, or another such receptacle such as a magnet or closable container) disposed thereon.

According to an alternative exemplary embodiment, the at least one adjustable closure panel may be configured to be housed in at least one adjustable closure panel compartment disposed on the tackle box housing; for example, one or more of the adjustable closure panels may be stored in an adjustable closure panel compartment located on one side of the tackle box, and one or more of the adjustable closure panels may be stored in an adjustable closure panel compartment located on the other side of the tackle box. The adjustable closure panels may be moved from a stored position, wherein they are wholly or partly recessed in the adjustable closure panel compartment, to a closed position, where they cover the contents of the tackle box.

In some embodiments, a fishing tackle box may include a second internal cavity separate from the first internal cavity, which may be formed in the bottom part of the box or elsewhere, and which may house at least one separately operable container formed within the second internal cavity. This may be, for example, a drawer or plurality of drawers.

The lure retaining holes of the fishing tackle box may include a centrally-disposed circular wide portion, and two substantially rectangular narrow portions each disposed on opposite sides of the wide portion and extending radially away from the wide portion, each of the narrow portions having a radial dimension and a tangential dimension, the radial dimension of each of the narrow portions being at least two times that of the respective tangential dimension of the narrow portion. Some variance in this shape may be understood; for example, certain lures may have a diving fin that is curved or otherwise not straight across, and as such curved narrow portions may be provided. Optionally, these retaining holes may have a reinforced edge; for example, the edge may be thickened, or a separate edge reinforcement may be provided as a separate piece.

The adjustable closure panels of the fishing tackle box may be connected to the tackle box housing by a hinge, or by another closure. The adjustable closure panels may allow a user to lock them or unlock them in a closed position, and may have a cover portion such that they cover any other containers of the tackle box when closed.

The fishing tackle box may further include a carry handle, which may be located on the top portion of the tackle box housing.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

According to an exemplary embodiment, and referring generally to the Figures, various exemplary implementations of a fishing tackle box may be disclosed. In some embodiments, such a fishing tackle box may allow a user to more easily view and access certain items of fishing tackle, such as fishing lures. In some embodiments, such a fishing tackle box may also make it easier to clean certain items of fishing tackle, such as fishing lures. Various configurations of the tackle box may be understood; for example, according to some exemplary embodiments, the tackle box may have any shape (for example, it may have a flat top or a rounded top) and may be constructed from any suitable material.

Figure 1A:
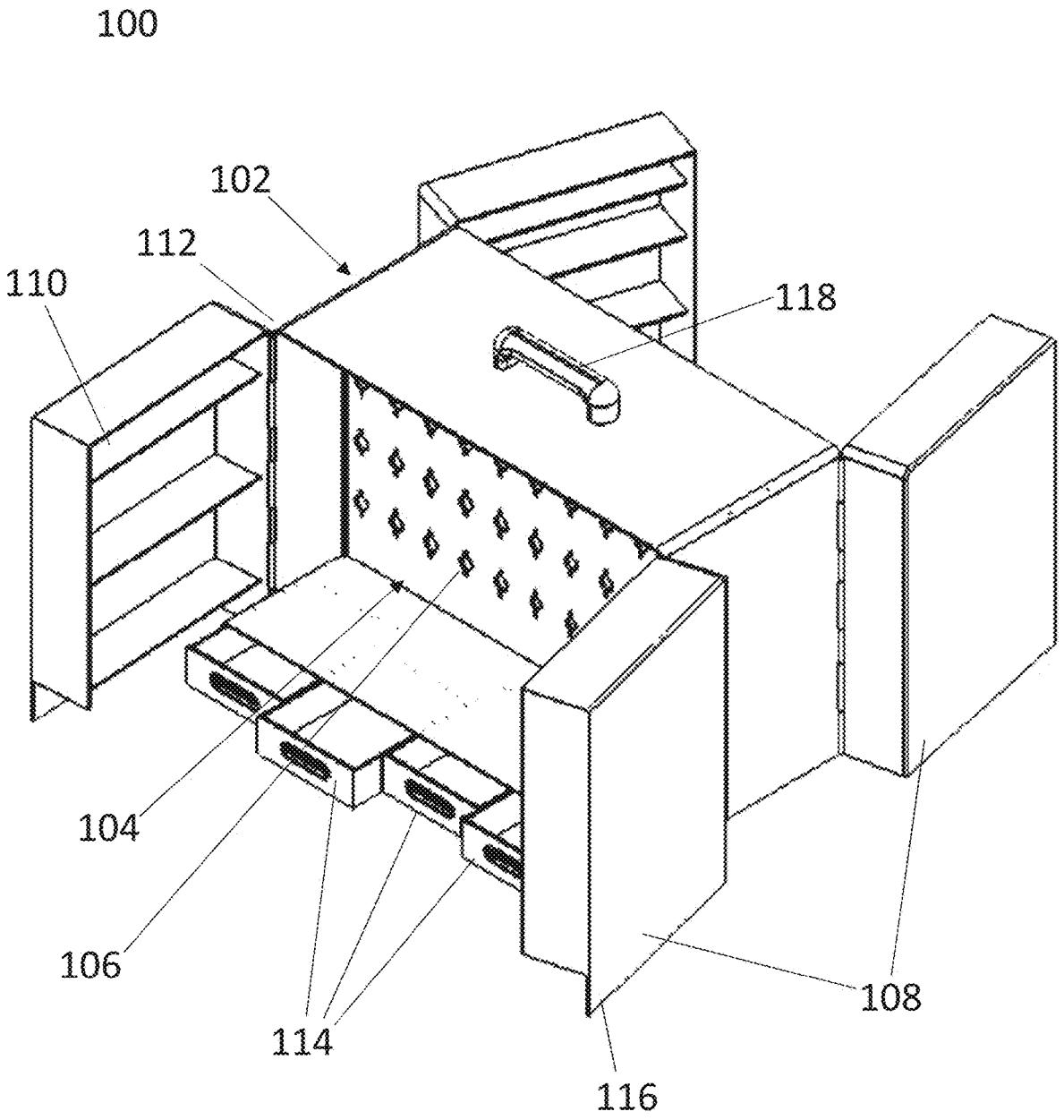
FIG. 1a depicts an exemplary embodiment of a fishing tackle box.

Turning now to exemplary FIG. 1a, FIG. 1a displays an exemplary embodiment of a fishing tackle box 100. According to an exemplary embodiment, a fishing tackle box 100 may include a housing 102, one or more lure retaining boards 104 having a plurality of lure retaining holes 106, one or more shelf platforms 108 each having one or more shelves 110 or other compartments, and one or more drawers 114, which may be disposed in, for example, the housing 102 or, in an embodiment wherein the lure retaining board 104 is disposed in a separate insert, in the lure retaining board 104, as may be desired. Shelf platforms 108 of the tackle box 100 may be connected to the housing 102, for example with hinges 112 or other connectors, as may be desired. Tackle box 100 may include one or more carrying handles 118 or carrying straps, or another feature that may be used to assist in carrying the tackle box 100, as desired.

According to an exemplary embodiment, the housing 102 and the lure retaining boards 104 of the tackle box 100 may be constructed from a rigid material, such as metal, plastic, or fiberglass. However, in another exemplary embodiment, one or both of the housing 102 and the lure retaining boards 104 may be constructed from a flexible material. For example, according to an exemplary embodiment, the housing 102 of the tackle box 100 may be constructed from a rigid material, and the lure retaining board 104 may be constructed from a flexible material, such as nylon or another fabric. Such a flexible lure retaining board 104 may be configured to use the housing 102 as a frame; for example, it may be coupled to internal walls of the housing 102 or internal corners of the housing 102, and stretched across an internal cavity of the housing 102. In another exemplary embodiment, tackle box 100 may instead be a tackle bag constructed in whole or in part from flexible material, and the lure retaining board 104 may be constructed from a rigid material in order to function as part of an internal skeleton or frame for the tackle bag.

According to an exemplary embodiment, a lure retaining board 104 may have a plurality of lure retaining holes 106, which may be sized or otherwise configured to hold one or more lures. For example, a lure retaining hole 106 may have a wide portion, and one or more narrow portions extending away from the wide portion. In an embodiment, a lure that has an integrated diving lip or crankbait lip, or a lure to which a diving lip can be attached, may be inserted through the lure retaining hole 106 by, for example, turning the lure sideways so that each side of the diving lip is substantially parallel to one or more narrow portions extending away from the wide portion of the lure retaining hole 106. The diving lip of the lure can then be inserted through the lure retaining hole 106. The lure may then be turned when the diving lip of the lure is all the way through the lure retaining hole 106, preventing the lure from being removed from the lure retaining hole 106 without turning the lure back to a position similar to the one it was in when inserted into the lure retaining hole 106. Lures may also be inserted into the lure retaining holes 106 in another manner, or may be coupled to more than one lure retaining hole 106, for example by looping the lure around the space between the lure retaining holes 106, as desired.

In some embodiments, different sizes or shapes of lure retaining hole 106 may be understood and may be integrated into a lure retaining board 104, as desired. For example, according to an exemplary embodiment, small, medium, and large-sized holes 106 all substantially resembling one another in shape may each be present in some quantity on a lure retaining board 104. This may allow different sizes or shapes of lures to be inserted onto or otherwise retained on the lure retaining board 104, as desired.

In some exemplary embodiments, a lure retaining board 104 may be constructed from a transparent or translucent material, such as clear acrylic. This may allow items on the other side of the lure retaining board 104 to be seen by a user looking at one side of the lure retaining board 104. In other embodiments, lure retaining board 104 may be opaque. In some embodiments, the sections of the lure retaining board 104 surrounding some or all of each lure retaining hole 106 may be constructed from a different material; for example, in some embodiments, an acrylic lure retaining board 104 having a number of lure retaining holes 106 may have the perimeters of each of those lure retaining holes 106 reinforced with a stronger material, such as metal or thicker acrylic, in order to better prevent crack formation and proliferation around the lure retaining holes 106.

According to some exemplary embodiments, multiple lure retaining boards 104 may be present in the housing 102 of the tackle box 100. This may allow a greater number of lures to be stored. In an exemplary embodiment, each of the multiple lure retaining boards 104 may be accessed from a different side of the tackle box 100. In some other exemplary embodiments, shorter lure retaining boards 104 may be provided between a central lure retaining board 104 or set of lure retaining boards 104 and a shelf portion 108 of the tackle box; this may allow additional lures to be stored within the tackle box 100 while still permitting access to the central lure retaining board 104 or set of retaining boards 104. In another exemplary embodiment, only a single lure retaining board 104 may be provided within the housing 102 of the tackle box 100; in an exemplary embodiment, a single lure retaining board 104 may permit access from more than one side of the housing 102 of the tackle box 100, if desired.

According to an exemplary embodiment, a tackle box 100 may have one or more compartments disposed in a cover of the tackle box 100, and which may be flexibly attached to the tackle box 100, if desired. For example, according to an exemplary embodiment, a tackle box 100 may have a plurality of shelf platforms 108, each of which may be attached to the housing 102 of the tackle box 100 by a hinge 112 or other flexible attachment and each of which may contain one or more compartments, such as shelves 110, configured to hold articles of fishing tackle. In another exemplary embodiment, compartments other than shelves 110, such as, for example, drawers, or cabinet-type compartments having spaces housed behind separately-operable doors, may be disposed in the shelf platforms 108 instead of or in addition to shelves 110.

Other attachment configurations between a cover of the tackle box 100 and a housing 102 of the tackle box 100, other than flexible attachment, may also be understood. For example, in an exemplary embodiment, a cover of the tackle box 100 may be slidably attached to the housing 102 of the tackle box 100, and may, for example, slide upward or sideways in order to expose the contents.

According to an exemplary embodiment, a cover of the tackle box 100, such as a shelf platform 108, may be constructed from a flexible or a rigid material. For example, according to an exemplary embodiment wherein a tackle box 100 is a tackle bag, a shelf platform 108 may instead be a flexible cover, which may have one or more pockets for tackle, as desired.

According to an exemplary embodiment, shelves 110, or other such compartments disposed on the shelf platforms 108, may include one or more retaining sites or retaining mechanisms for tackle. For example, according to an exemplary embodiment, a particular section of one or more of the shelf platforms 108 may be dedicated to holding the reels of a user, and as such the applicable shelf 110 of the shelf platform 108 may include one or more reel mounts on which one or more reels can be disposed. Another section of the shelf platform 108 may have, for example, a magnetic strip to which hooks or weights may be magnetically coupled, if desired.

In some exemplary embodiments, lures to be stored may have one or more treble hooks, instead of or in addition to other kinds of hooks. According to an exemplary embodiment, a shelf platform 108 may include, for example, one or more slots disposed therein, which may permit the lures to be hung vertically by one or more of the treble hooks, if desired. In some embodiments, other hooks, such as large single hooks intended to, for example, avoid weeds, may be present on a lure, and the lure may be hung by one or more other hooks instead or in addition to treble hooks, if desired. Slots may be, for example, straight and narrow slots extending from an outer portion of a shelf 110 to the base portion of the shelf 110, near where the shelf 110 meets the shelf platform 108. Slots having other shapes, such as, for example, curved or J-shaped slots, may be additionally used or used instead of other slots, if desired. According to some exemplary embodiments, the shelf platform 108 may include one or more elastic bands, suspended under a shelf 110 having one or more slots, which may be used to secure vertically-hanging lures in place, if desired.

According to an exemplary embodiment, a tackle box 100 may have one or more compartments separate from the shelf platforms 108. For example, according to an exemplary embodiment, a tackle box 100 may have one or more drawers 114, each operable by a handle, which may be disposed in the housing 102 of the tackle box 100, for example under the lure retaining board 104 or elsewhere in the tackle box 100, as desired. Other compartments, such as removable storage boxes having spaces enclosed by separately-operable doors, may also be used or may substitute for drawers 114, if desired. In some exemplary embodiments, drawers 114 or other compartments may be separately locking, if desired, and may, for example, be releasable by operation of the handle of the drawer 114.

In an exemplary embodiment wherein removable storage boxes are used in addition to or in place of drawers 114, removable storage boxes may be disposed between one or more shelves located beneath the lure retaining board 104, or in one or more openings located beneath the lure retaining board 104 (or elsewhere in the tackle box 100, as desired), and may be fitted such that they can be slid in and out of the space between the one or more shelves or the one or more openings, allowing removal or replacement of the removable storage boxes, if desired. In some embodiments, removable storage boxes may be configured to hold any items of fishing tackle; in other exemplary embodiments, removable storage boxes may be configured to hold specific items of fishing tackle, such as lures, line, hooks, weights, tools, or other items used in fishing, as may be desired.

According to an exemplary embodiment, the shelf platforms 108 may be formed so that a cover section 116 of the shelf platform 108 fits over the one or more compartments, such as the one or more drawers 114, which are separated from the shelf platform 108. In some exemplary embodiments, drawers 114 or other compartments may be located on the bottom portion of the housing 102 of the tackle box 100, and the cover section 116 may be a lower portion of a shelf platform 108 that is placed to fit over the cover section 116. In other exemplary embodiments, drawers 114 or other compartments may be located elsewhere on the tackle box 100, and the cover section 116 may be a corresponding portion of the shelf platform 108 such that the cover section 116 fits over the shelf platform 108. According to some exemplary embodiments, cover section 116 may function to prevent certain individual components of the tackle box 100, such as drawers 114, from unintentionally opening, and may also serve to protect those components of the tackle box 100 from damage or from the elements.

In some exemplary embodiments, a tackle box 100 may have a handle 118 by which the tackle box 100 may be carried. Handle 118 may be, for example, centrally located on top of the housing 102 of the tackle box 100. Alternatively, multiple handles 118 may be present, and may for example be disposed on the sides of the tackle box 100; this may be done if, for example, the tackle box 100 is particularly large and is intended to be carried with two hands or by more than one person. In other exemplary embodiments, the tackle box 100 may have another mechanism, other than a handle 118, to allow the tackle box 100 to be carried. For example, in some embodiments, such as when the tackle box 100 is a tackle bag, a carry strap may be present instead of or in addition to the handle 118.

Figure 1B:
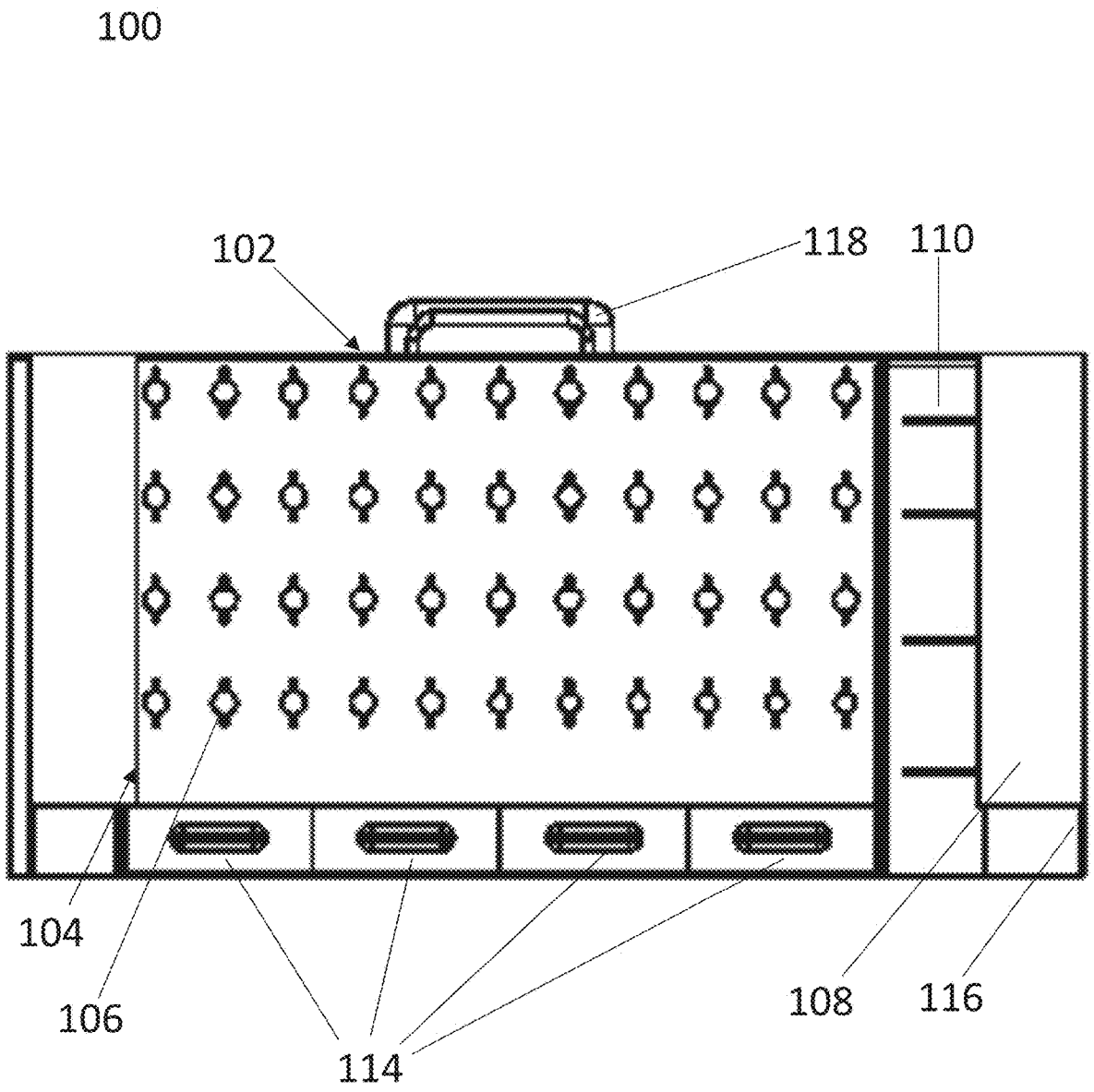
FIG. 1b depicts an exemplary embodiment of a fishing tackle box, as viewed from the front.

Turning now to exemplary FIG. 1b, FIG. 1b shows an exemplary embodiment of a front view of a tackle box 100. As shown, and according to an exemplary embodiment, the lure retaining holes 106 of a tackle box 100 may have different sizes or even different shapes, as desired.

Figure 1C:
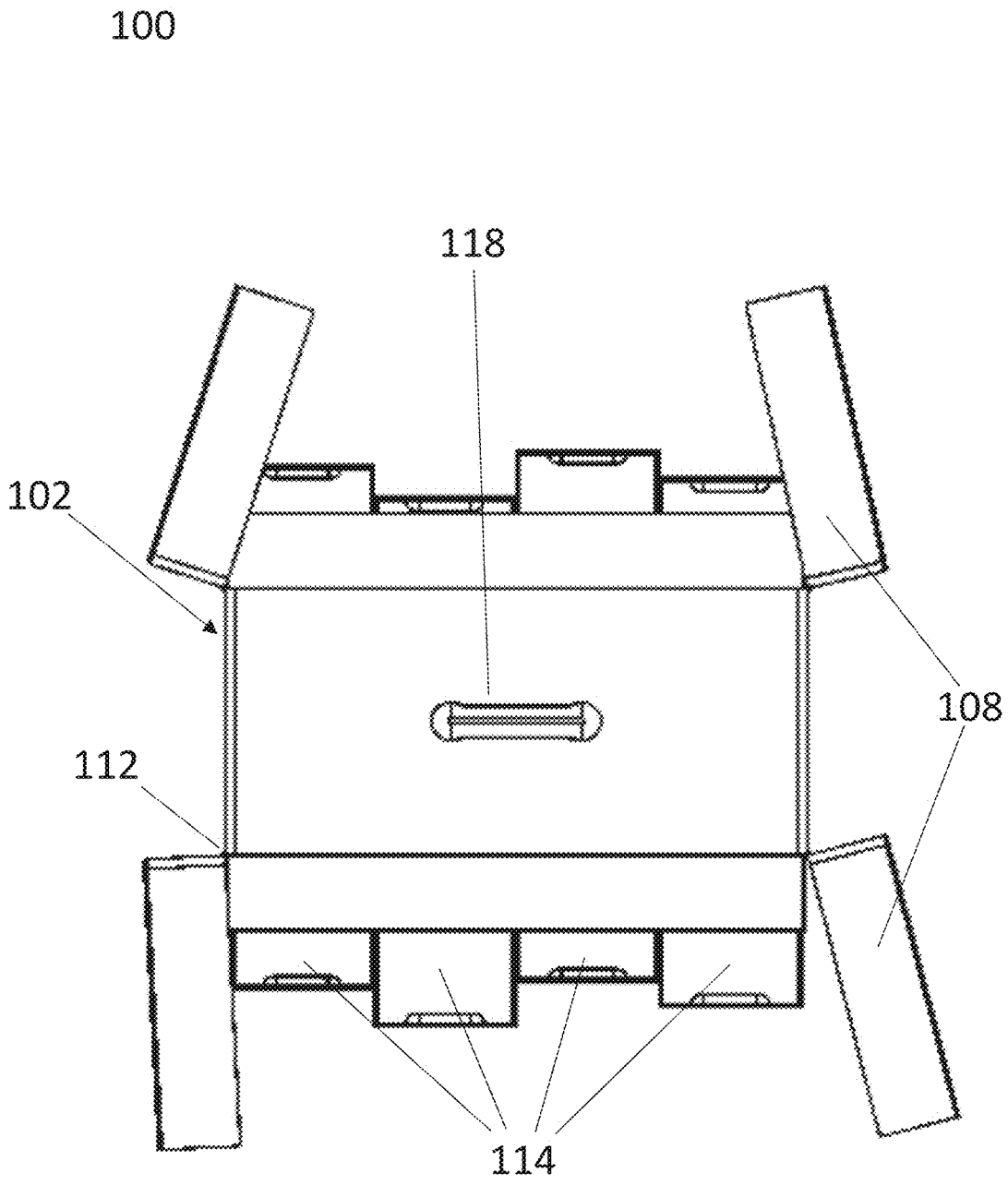
FIG. 1c depicts an exemplary embodiment of a fishing tackle box, as viewed from the top.

Turning now to exemplary FIG. 1c, FIG. 1c shows an exemplary embodiment of a top view of a tackle box 100. According to an exemplary embodiment, a tackle box 100 may be one-sided, two-sided, or many-sided. For example, according to an exemplary embodiment, a tackle box 100 may have similar shelf platforms 108 located on both a front side and a back side of the tackle box 100. Likewise, the tackle box 100 may have a plurality of compartments, such as drawers 114, disposed on multiple sides, such as the front and back sides, of the tackle box 100.

Figure 2:
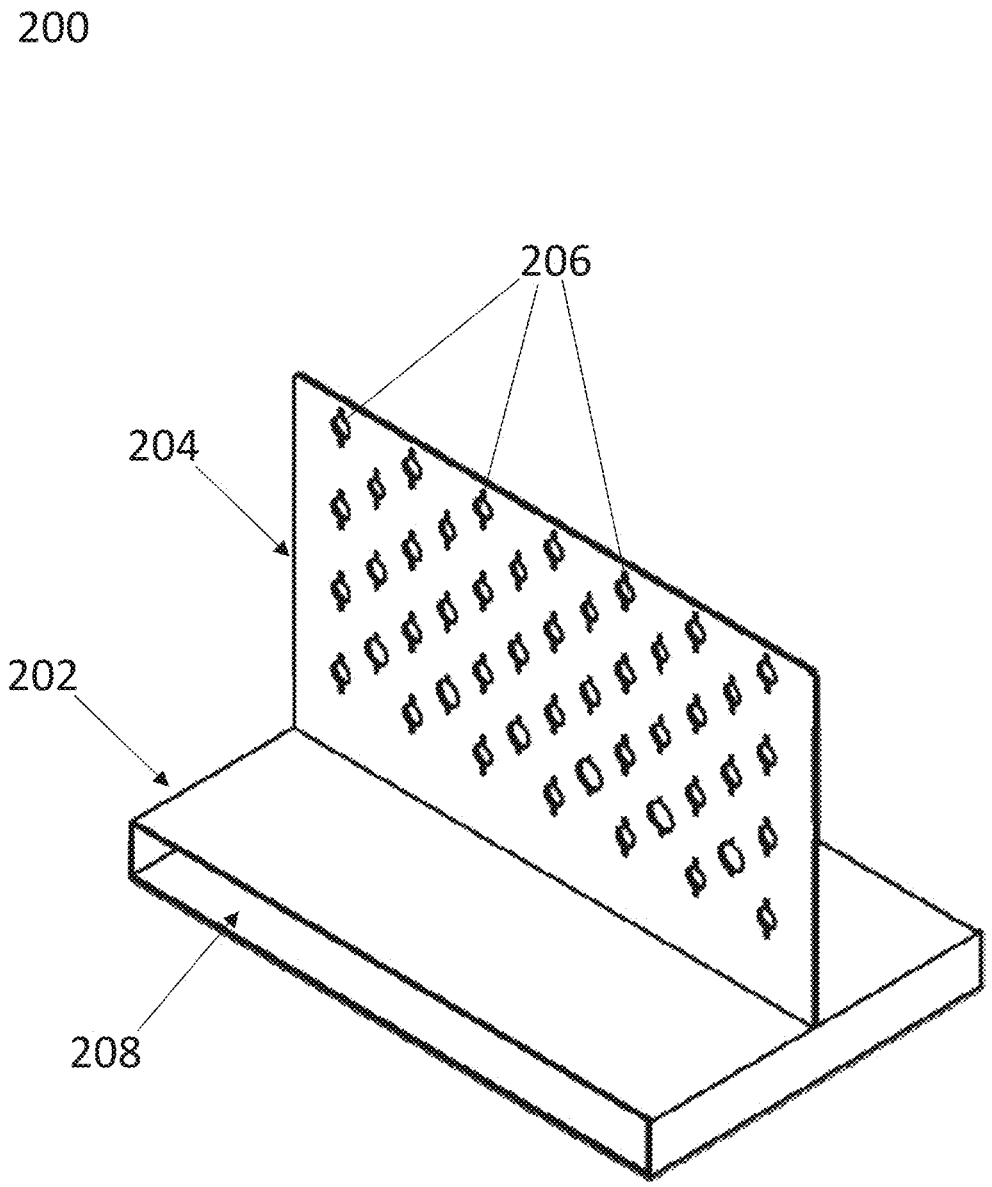
FIG. 2 depicts an exemplary embodiment of a single-board tackle box insert.

Turning now to exemplary FIG. 2, FIG. 2 shows an exemplary embodiment of a single-board tackle box insert 200. In some embodiments, the lure retaining board portion 104 of a tackle box 100 may be insertable as a separate insert 200, the insert 200 having a base portion 202 and a lure retaining board portion 204, the lure retaining board 204 of the insert 200 having a plurality of lure retaining holes 206. For example, according to an exemplary embodiment, an insert 200 for a tackle box 100 having a lure retaining board 104 may be placed inside a tackle box 100 by opening up the tackle box 100 to reveal the inside of the housing 102, and then placing the insert 200 inside the housing 102, for example by attaching the insert 200 to one or more connectors located within the housing 102, or by sliding the insert 200 into the housing 102 such that, for example, the base portion 202 of the insert 200 interfaces with one or more guide rails in the inner part of the housing 102. In another exemplary embodiment, an insert 200 may serve as the lower portion of a housing 102; for example, in one exemplary embodiment, an insert 200 may slide into the underside of a housing 102 or may allow a housing 102 to be coupled to the top of the insert 200, as may be desired.

In some embodiments, the base 202 of the insert 200, or another part of the insert 200, may have one or more slots 208 in which removable compartments, such as drawers 114, may be slotted. In other exemplary embodiments, the base 202 of the insert 200 may have one or more compartments integrated with the base 202 of the insert 200; for example, the base 202 of the insert 200 may have a nonremovable drawer 114 or a nonremovable door through which a compartment can be accessed.

Figure 3:
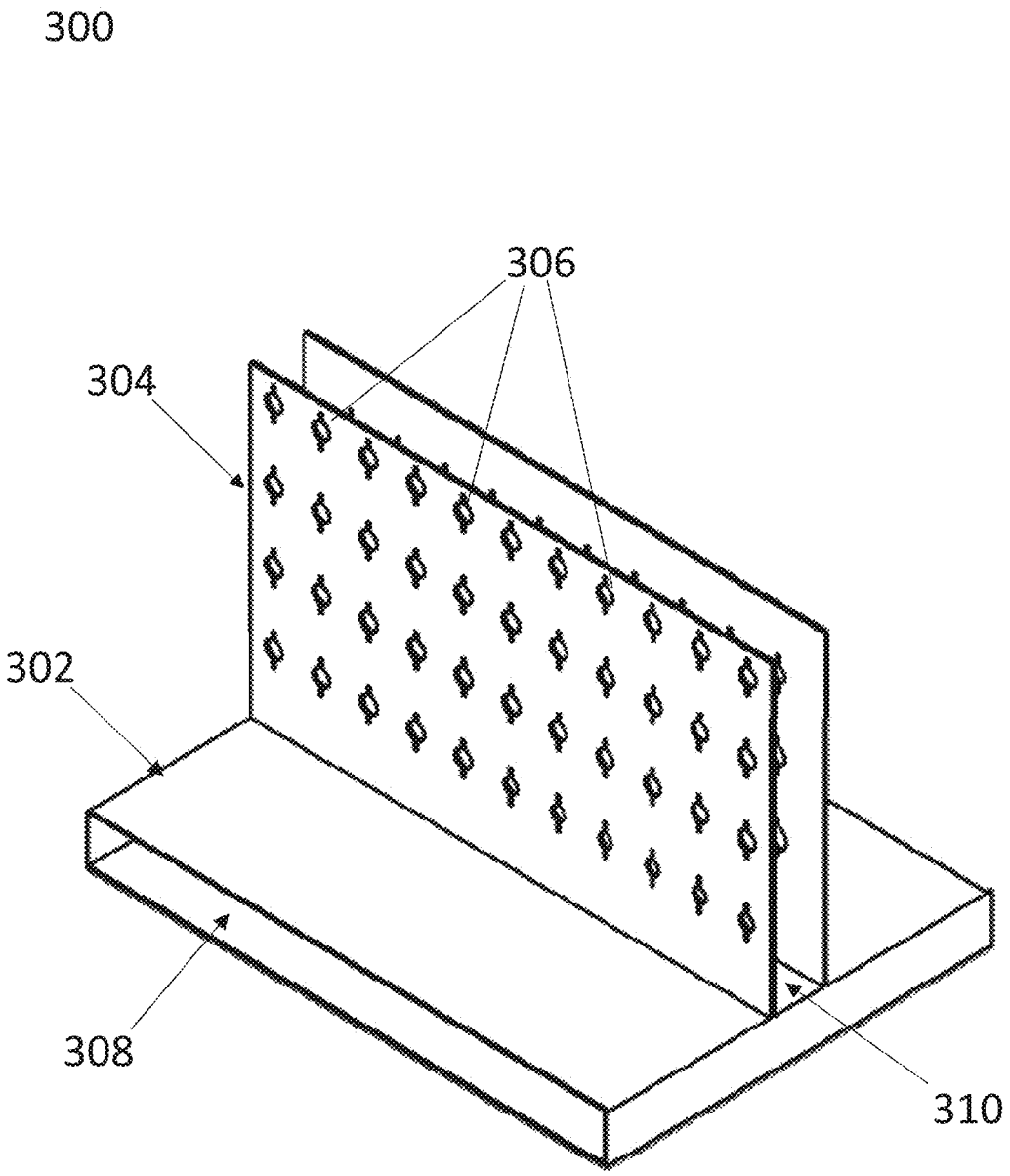
FIG. 3 depicts an exemplary embodiment of a double-board tackle box insert.

Turning now to exemplary FIG. 3, FIG. 3 shows an exemplary embodiment of a double-board tackle box insert 300, which may include a base 302, multiple lure retaining boards 304 each having a plurality of lure retaining holes 306 and spaced apart by a gap 310, and a slot for removable containers 308, or one or more containers such as drawers 114, provided within the base 302 of the insert 300.

Figure 4:
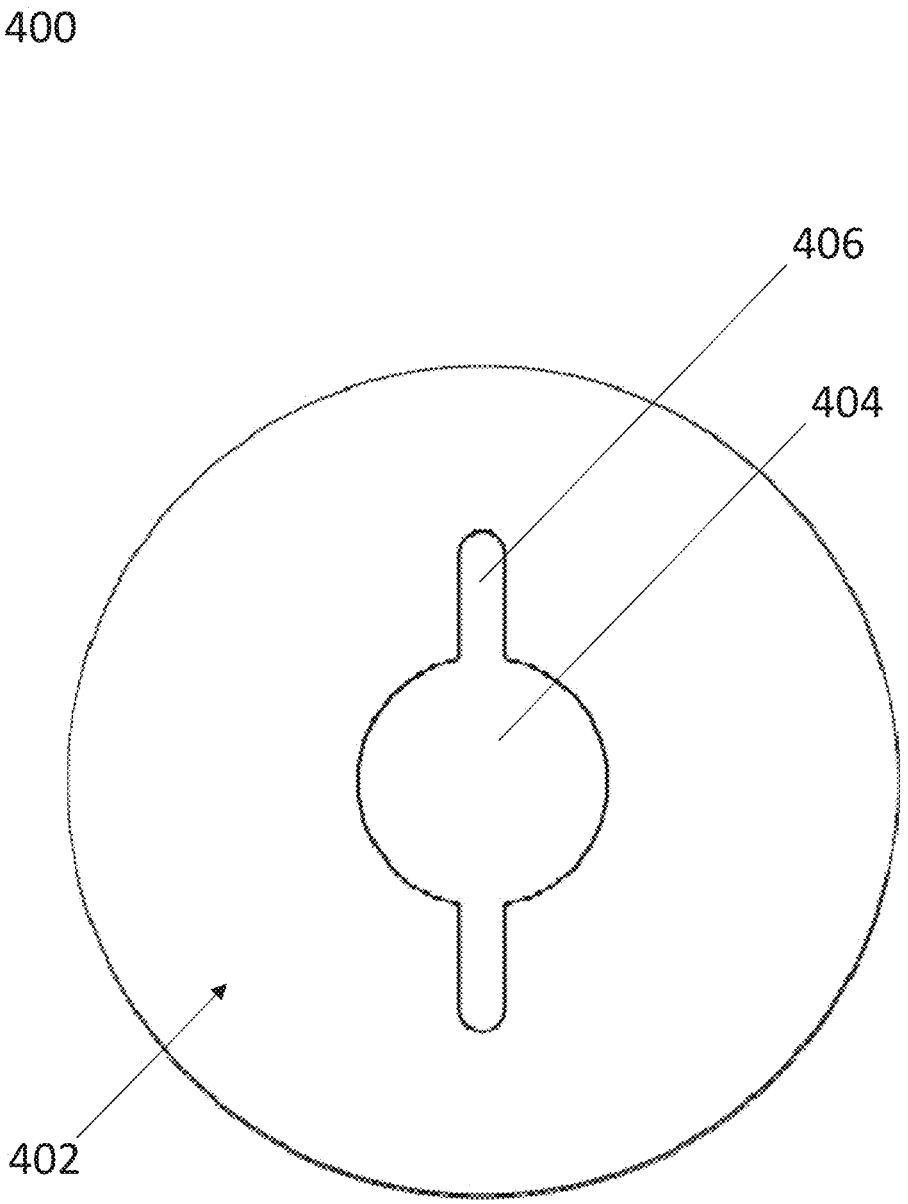
FIG. 4 depicts an exemplary embodiment of a lure retaining hole.

Turning now to exemplary FIG. 4, FIG. 4 shows a detail view of an exemplary embodiment of a lure retaining hole 400. Lure retaining hole 400 may be disposed in a lure retaining board 402, and may have a wide portion 404 and one or more narrow portions 406 provided on the side of the wide portion 404. In some embodiments, multiple narrow portions 406 may be provided on separate sides of the wide portion 404; in an exemplary embodiment, narrow portions 406 may be provided on opposite sides of the wide portion 404 in order to better accommodate lures having wider diving lips, and in another exemplary embodiment, narrow portions 406 may be provided on non-opposite sides of the wide portion 404 in order to better accommodate lures having curved diving lips. In some exemplary embodiments, wide portion 404 may be round; in other exemplary embodiments, the wide portion 404 as well as the narrow portion 406 may be any other shape, as desired.

Figure 5:
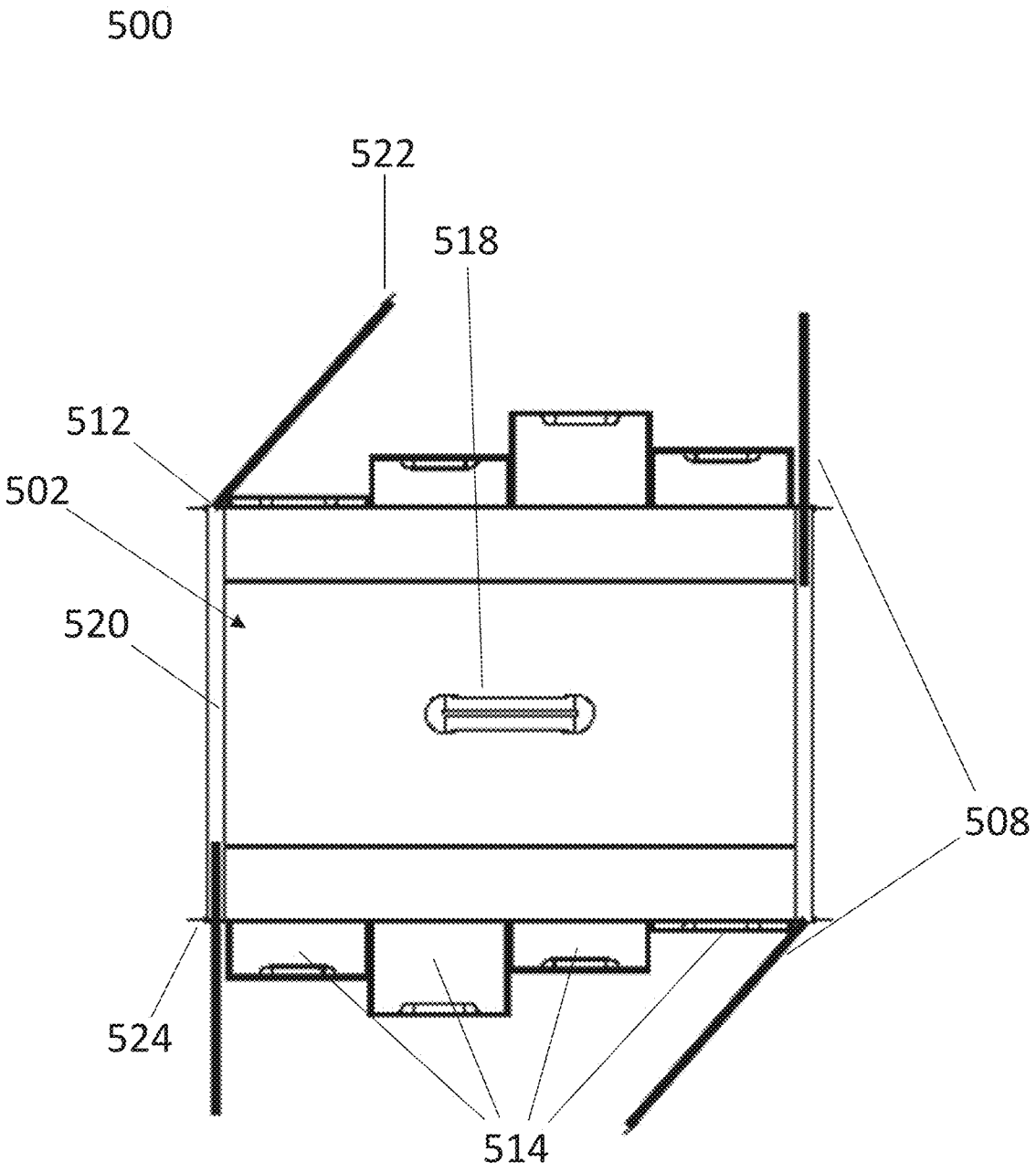
FIG. 5 depicts an exemplary embodiment of a fishing tackle box.

Turning now to exemplary FIG. 5, FIG. 5 displays an exemplary embodiment of a fishing tackle box 500. According to an exemplary embodiment, a fishing tackle box 500 may include a housing 502, one or more lure retaining boards 504 having a plurality of lure retaining holes 506, one or more retractable and pivoting covers 508, and one or more shelves or compartments 514, which may be disposed in, for example, the housing 502 or, in an embodiment wherein the lure retaining board 504 is provided on a separate insert, in a section of the insert including the lure retaining board 504, as may be desired. Tackle box 500 may include one or more carrying handles 518 or carrying straps, or another feature that may be used to assist in carrying the tackle box 500, as desired.

According to an exemplary embodiment, one or more retractable and pivoting covers 508 of the tackle box 500 may be configured such that they may be slidable from a covering state, wherein the one or more retractable and pivoting covers 508 covers one or more of the sides of the tackle box 500, to a retracted state, wherein the contents of the tackle box 500 are exposed. In an exemplary embodiment, the tackle box housing 502 may include one or more vertically-disposed compartments 520 on one or more of the ends of the tackle box housing 502, such that the one or more retractable and pivoting covers 508 may be slid into and stored within the compartment 520, if desired. For example, according to an exemplary embodiment, a vertically-disposed compartment 520 may be disposed on either side of the tackle box housing 502 such that a retractable and pivoting cover 508 slidable over one of the sides of the tackle box 500 may be slid within the compartment 520 from one side of the tackle box 500, and another retractable and pivoting cover 508 may be slid into the compartment 520 from the other side of the tackle box 500, such that two retractable and pivoting covers 508 may be stored side-by-side with one another in the same compartment 520 when both of the sides of the tackle box 500 have been opened. Alternatively, retractable and pivoting covers 108 may be slidable to the side of the tackle box 500 or to another position wherein they do not block access to the contents of the tackle box, as desired.

In some exemplary embodiments, the retractable and pivoting covers 508 may be connected to the tackle box housing 502, with, for example, hinges 512 or other connectors. In other exemplary embodiments, retractable and pivoting covers 508 may be slidable on a rail. Combinations of connectors may also be understood; for example, according to an exemplary embodiment, a hinge 512 permitting rotation of the retractable and pivoting cover 508 may be mounted on the end of a telescoping section, such that the retractable and pivoting cover 508 may be removed from a compartment 520 by extending the telescoping section and then rotated on the hinge 512 in order to cover the contents of the tackle box 500. In some exemplary embodiments, retractable and pivoting covers 508 may have a closure 522 such that the retractable and pivoting covers 508 can be secured in a closed position. In some exemplary embodiments, compartments 520 may also have a closure 524 such that, when the retractable and pivoting covers 508 are extended or unextended, the compartments 520 may be secured in order to keep the retractable and pivoting covers 508 in an extended or unextended position, as desired.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A fishing tackle [box] *storage device*, comprising:

[a tackle box housing, the tackle box housing comprising a rigid outer shell enclosing a first internal cavity, the tackle box housing having a front opening at a front end and a back opening at a back end, each of the front opening and the back opening adjoining the first internal cavity, the tackle box housing further comprising an inside wall] *a lure retaining board* having a plurality of lure retaining holes disposed therethrough, [each of] *wherein* the lure retaining holes [defined by the inside wall having] *have* a substantially round wide portion and at least two substantially rectangular narrow portions extending from the wide portion, wherein the substantially round wide portion and at least two substantially rectangular narrow portions have a rigidly defined shape and wherein each of the at least two substantially rectangular narrow portions is configured to receive a side of a lure body or lure lip[; and at least one adjustable closure panel disposed on each of the front end and the back end of the tackle box housing, the at least one adjustable closure panel of the front end being sized to cover the front opening of the tackle box housing and the at least one adjustable closure panel of the back end being sized to cover the back opening of the tackle box housing, each of the adjustable closure panel of the front end and the adjustable closure panel of the back end having at least one receptacle disposed thereon] *wherein the tackle storage device has an outer wall surrounding all perimeter sides of the lure retaining board,*

*wherein at least two of the plurality of lure retaining holes with the same shape have differently sized substantially round wide portions and differently sized at least two substantially rectangular narrow portions.*

[2. The fishing tackle box of claim 1, wherein the rigid outer shell further encloses a second internal cavity separate from the first internal cavity; and further comprising at least one separately operable container formed within the second internal cavity.]

[3. The fishing tackle box of claim 2, wherein the at least one separately operable container is a plurality of drawers.]

4. The fishing tackle [box] *storage device* of claim 1, wherein [each of the lure retaining holes comprises:

a centrally-disposed circular wide portion, and]

*the* two substantially rectangular narrow portions *are* each disposed on opposite sides of the *substantially round* wide portion and [extending] *extend* radially away from the *substantially round* wide portion, each of the narrow portions having a radial dimension and a tangential dimension, the radial dimension of each of the narrow portions being at least two times that of the respective tangential dimension of the narrow portion.

5. The fishing tackle [box] *storage device* of claim 1, wherein each of the lure retaining holes further comprises an edge reinforcement disposed around the perimeter of the lure retaining hole.

[6. The fishing tackle box of claim 1, wherein the at least one adjustable closure panel is connected to the tackle box housing by a hinge.]

[7. The fishing tackle box of claim 1, wherein the at least one receptacle of the at least one adjustable closure panel comprises a shelf.]

[8. The fishing tackle box of claim 1, further comprising a carry handle disposed on the top portion of the tackle box housing.]

9. The fishing tackle [box] *storage device* of claim 1, further comprising a plurality of [inside walls] *lure retaining boards* having a plurality of lure retaining holes disposed therethrough[, each of the lure retaining holes defined by the inside walls having a substantially round wide portion and at least one substantially rectangular narrow portion extending from the wide portion].

10. The fishing tackle [box] *storage device* of claim 1, wherein the [inside wall] *lure retaining board* is transparent.

11. A system, comprising:

[A] *a* fishing tackle [box] *storage device*, the fishing tackle [box] *storage device* comprising:

a [tackle box] housing, the [tackle box] housing comprising [a rigid] *an* outer shell enclosing a first internal cavity, the [tackle box] housing having a front opening at a front end [and a back opening at a back end, each of the front opening and the back opening] adjoining the first internal cavity; [and at least one adjustable closure panel disposed on each of the front end and the back end of the tackle box housing, the at least one adjustable closure panel of the front end being sized to cover the front opening of the tackle box housing and the at least one adjustable closure panel of the back end being sized to cover the back opening of the tackle box housing, each of the adjustable closure panel of the front end and the adjustable closure panel of the back end having at least one receptacle disposed thereon; and]

an insert *disposed within the housing and abutting the housing along a perimeter of the insert*, the insert comprising [a base and an inside wall] *a lure retaining board* having a plurality of lure retaining holes disposed therethrough, [each of] *wherein* the lure retaining holes [defined by the inside wall having] *have* a substantially round wide portion and at least two substantially rectangular narrow portions extending from the wide portion, wherein the substantially round wide portion and at least two substantially rectangular narrow portions have a [rigidly] defined shape, [the insert being sized to fit within and adapted to be inserted into the first internal cavity of the tackle box housing,] and wherein each of the at least two substantially rectangular narrow portions is configured to receive a side of a lure body or lure lip, *and*

*wherein at least two of the plurality of lure retaining holes with the same shape have differently sized substantially round wide portions and differently sized at least two substantially rectangular narrow portions.*

12. The system of claim 11, wherein *the tackle storage device comprises a first internal cavity, the insert further comprises a base and* the base of the insert encloses a second internal cavity; and further comprising at least one separately operable container formed within the second internal cavity.

13. The system of claim 12, wherein the at least one separately operable container is a plurality of drawers.

14. The system of claim 11, wherein each of the lure retaining holes comprises:

a centrally-disposed circular wide portion, and two substantially rectangular narrow portions each disposed on opposite sides of the wide portion and extending radially away from the wide portion, each of the narrow portions having a radial dimension and a tangential dimension, the radial dimension of each of the narrow portions being at least two times that of the respective tangential dimension of the narrow portion.

15. The system of claim 11, wherein each of the lure retaining holes further comprises an edge reinforcement disposed around the perimeter of the lure retaining hole.

16. The system of claim 11, wherein the *tackle storage device further comprises* at least one [adjustable] closure panel[is connected to the tackle box housing by a hinge].

17. The system of claim 11, [wherein the at least one receptacle of the] *further comprising* at least one adjustable closure panel [comprises a shelf] *comprising at least one receptacle*.

18. The system of claim 11, wherein the insert further comprises a plurality of [inside walls] *lure retaining boards* having a plurality of lure retaining holes disposed therethrough[, each of the lure retaining holes defined by the inside walls having a substantially round wide portion and at least one substantially rectangular narrow portion extending from the wide portion].

19. The system of claim 11, wherein the [inside wall] *lure retaining board* of the insert is transparent.

[20. A fishing tackle box, comprising:

a tackle box housing, the tackle box housing comprising a rigid outer shell enclosing a first internal cavity, the tackle box housing having a front opening at a front end and a back opening at a back end, each of the front opening and the back opening adjoining the first internal cavity, the tackle box housing further comprising an inside wall having a plurality of lure retaining holes disposed therethrough, each of the lure retaining holes defined by the inside wall having a substantially round wide portion and at least one substantially rectangular narrow portion extending from the wide portion;

at least one adjustable closure panel disposed on each of the front end and the back end of the tackle box housing, the at least one adjustable closure panel of the front end being sized to cover the front opening of the tackle box housing and the at least one adjustable closure panel of the back end being sized to cover the back opening of the tackle box housing; and at least one adjustable closure panel compartment having an opening on each of the front end and the back end of the tackle box housing, the at least one adjustable closure panel compartment being sized to fit the at least one adjustable closure panel of the front end and the at least one closure panel of the back end;

wherein each of the adjustable closure panel of the front end and the adjustable closure panel of the back end is slidable between a cover position and a recessed position, the cover position of the adjustable closure panel of the front end being a position wherein the adjustable closure panel of the front end covers the front opening of the tackle box housing and the recessed position of the adjustable closure panel of the front end being a position wherein substantially all of the adjustable closure panel of the front end is housed within the at least one adjustable closure panel compartment, and the cover position of the adjustable closure panel of the back end being a position wherein the adjustable closure panel of the back end covers the back opening of the tackle box housing and the recessed position of the adjustable closure panel of the back end being a position wherein substantially all of the adjustable closure panel of the back end is housed within the at least one adjustable closure panel compartment.]

*21. The system of claim 11, wherein the fishing tackle storage device is a tackle box.*

*22. The system of claim 11, wherein the fishing tackle storage device is a tackle bag.*

*23. The tackle storage device of claim 11, further comprising a second lure retaining board spaced between the front opening and the lure retaining board, wherein the second lure retaining board is shorter than the lure retaining board to allow access to the lure retaining board.*

*24. A lure retaining device comprising:*

*a surface having a plurality of lure retaining holes disposed therethrough, the plurality of lure retaining holes comprising a round central cavity and at least two narrow lip receiving cavities projecting therefrom; and*

*an outer wall surrounding a perimeter of the surface;*

*wherein the at least two narrow lip receiving cavities have a spaced gap between a first parallel edge and a second parallel edge,*

*wherein the at least two narrow lip receiving cavities are configured to receive a portion of a lure lip when a lure is being inserted into the lure retaining hole and wherein the depth of the surface is configured to allow the lure lip to pass completely through the at least two narrow lip receiving cavities such that the lure lip is not disposed within the at least two narrow lip receiving cavities when the lure is fully inserted in the lure retaining hole,*

*wherein at least two of the plurality of lure retaining holes with the same shape have differently sized central round cavities and differently sized at least two narrow lip receiving cavities.*

*25. The lure retaining device of claim 24, wherein the at least two narrow lip receiving cavities are curved along a longitudinal length.*

* * * * *